(12) United States Patent  
Chen et al.

(10) Patent No.: US 8,884,915 B2
(45) Date of Patent: Nov. 11, 2014

(54) METHOD AND DRIVING APPARATUS FOR IDENTIFYING SENSING VALUE OF TOUCH PANEL

(75) Inventors: Po-Yang Chen, Miao-Li County (TW); Po-Sheng Shih, Miao-Li County (TW); Chien-Yung Cheng, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 302 days.

(21) Appl. No.: 13/226,470

(22) Filed: Sep. 6, 2011

(65) Prior Publication Data

US 2012/0056851 A1 Mar. 8, 2012

(30) Foreign Application Priority Data

Sep. 7, 2010 (CN) .......................... 2010 1 0274583

(51) Int. Cl.
 *G06F 3/045* (2006.01)
 *G06F 3/041* (2006.01)
 *G06F 3/044* (2006.01)

(52) U.S. Cl.
 CPC .............. *G06F 3/044* (2013.01); *G06F 3/0418* (2013.01)
 USPC ......................................... 345/174; 345/173

(58) Field of Classification Search
 CPC ................................ G06F 3/0418; G06F 3/044
 USPC ........................................................ 345/173
 See application file for complete search history.

(56) References Cited

U.S. PATENT DOCUMENTS

| | | | |
|---|---|---|---|
| 2006/0192690 A1* | 8/2006 | Philipp | 341/33 |
| 2006/0249726 A1* | 11/2006 | Choi et al. | 257/9 |
| 2009/0191367 A1* | 7/2009 | Chen | 428/34.1 |
| 2009/0267914 A1* | 10/2009 | Dews et al. | 345/173 |
| 2010/0079401 A1* | 4/2010 | Staton | 345/174 |
| 2010/0252783 A1* | 10/2010 | Yeh | 252/513 |
| 2010/0321337 A1* | 12/2010 | Liao et al. | 345/174 |
| 2011/0073384 A1* | 3/2011 | Osoinach et al. | 178/18.06 |

* cited by examiner

*Primary Examiner* — Viet Pham
(74) *Attorney, Agent, or Firm* — Li & Cai Intellectual Property (USA) Office (57) ABSTRACT

A method and a driving apparatus for identifying a sensing value of a touch panel are provided. The method includes sensing a plurality of electrodes of the touch panel to obtain raw data and baseline data of each electrode, wherein an electrode $S_i$ denotes an $i^{th}$ electrode of the electrodes in the touch panel. A sensing value of the electrode $S_i$ is calculated in accordance with the raw data and the baseline data of the electrode $S_i$. When sensing values of all electrodes $S_i$ are smaller than a threshold value, the baseline data of the electrode $S_i$ is updated in accordance with the raw data of the electrode $S_i$. When a sensing value of any one electrode $S_i$ of the electrodes is larger than the threshold value, the baseline data of the electrodes is suspended from being updated.

16 Claims, 13 Drawing Sheets

METHOD AND DRIVING APPARATUS FOR IDENTIFYING SENSING VALUE OF TOUCH PANEL

BACKGROUND

1. Technical Field

The present disclosure generally relates to a touch panel, and in particular, to a method for identifying a sensing value of a touch panel and a driving apparatus for performing the method.

2. Description of Related Art

In order to achieve objectives of more convenience, smaller volume and more humanization, input manners of many information products are converted from conventional apparatuses such as a keyboard or a mouse into a manner of using a touch panel as input. The touch panel may be mounted on various flat panel displays, so that the flat panel display has functions of both displaying images and inputting operation information. A conventional touch panel mainly includes a resistance type, a capacitance type, an infrared type and a surface acoustic wave type. Different touch panels respectively have advantages and disadvantages, for example, the capacitance type touch panel has advantages such as a good quality feeling and a small touch force, but the price is expensive. Reducing the cost of the touch panel and precisely positioning a touch point are always topics of the field.

SUMMARY OF THE DISCLOSURE

Accordingly, the present disclosure is directed to a method and a driving apparatus for identifying a sensing value of a touch panel, in which baseline data of all electrodes are suspended from being updated to retain information of a small touch point, so that a subsequent processing program precisely positions the touch point.

An embodiment of the present disclosure provides a method for identifying a sensing value of a touch panel. The method includes: sensing a plurality of electrodes of the touch panel to obtain raw data and baseline data of each electrode, in which an electrode $S_i$ denotes an $i^{th}$ electrode of the electrodes of the touch panel; calculating a sensing value of the electrode $S_i$ in accordance with the raw data and the baseline data of the electrode $S_i$; when sensing values of all electrodes $S_i$ are smaller than a threshold value, updating the baseline data of the electrode $S_i$ in accordance with the raw data of the electrode $S_i$; and when a sensing value of any one electrodes $S_i$ of the electrodes is larger than the threshold value, suspending updating the baseline data of the electrodes.

An embodiment of the present disclosure provides a driving apparatus of a touch panel. The driving apparatus of the touch includes a selector, a sensing circuit and a controller. The selector is connected to a plurality of electrodes of the touch panel, in which electrode $S_i$ denotes an $i^{th}$ electrode of the electrodes of the touch panel. The sensing circuit is connected to the selector. The sensing circuit senses the electrodes one by one through a switching operation of the selector, and obtains raw data and baseline data of each electrode $S_i$. The controller is connected to the sensing circuit. The controller calculates a sensing value of the electrode $S_i$ in accordance with the raw data and the baseline data of the electrode $S_i$. When sensing values of all electrodes $S_i$ are smaller than a threshold value, the controller updates the baseline data of the electrode $S_i$ in accordance with the raw data of the electrode $S_i$. When a sensing value of any one electrode $S_i$ of the electrodes is larger than the threshold value, the controller suspends updating the baseline data of the electrodes.

An embodiment of the present disclosure provides a method for identifying a sensing value of a touch panel. Two opposite side edges of the touch panel along a first axial direction respectively are a first side and a second side, the touch panel includes a plurality of electrode pairs, the electrode pairs respectively include a first electrode and a second electrode, the first electrodes are disposed at the first side of the touch panel, and the second electrodes are disposed at the second side of the touch panel. The method includes: sensing the electrode pairs of the touch panel to obtain raw data and baseline data of each electrode, in which an electrode $S_i$ denotes one of the first electrodes and the second electrodes of the touch panel; calculating a sensing value of the electrode $S_i$ in accordance with the raw data and the baseline data of the electrode $S_i$; when a sum of a sensing value of a first electrode and a sensing value of a second electrode of the electrode pairs is smaller than a threshold value, updating the baseline data of the electrode $S_i$ in accordance with the raw data of the electrode $S_i$; and when the sum of the sensing value of the first electrode and the sensing value of the second electrode of any one of the electrode pairs is larger than the threshold value, suspending updating the baseline data of the electrode pairs.

In an embodiment of the present disclosure, the step of updating the baseline data of the electrode $S_i$ includes: calculating $BL_i(n)=(N-1)\times BL_i(n-1)+(N)\times RD_i$. N is a constant ranging from 0 to 1, $RD_i$ denotes the raw data of the electrode $S_i$, $BL_i(n-1)$ denotes baseline data obtained before the electrodes $S_i$ is updated, and $BL_i(n)$ denotes baseline data obtained after the electrodes $S_i$ is updated.

In an embodiment of the present disclosure, the step of calculating the sensing value of the electrode $S_i$ includes: calculating a difference between the raw data of the electrode $S_i$ and the baseline data of the electrode $S_i$, so as to take the difference to be served as the sensing value of the electrode $S_i$.

In order to make the aforementioned features and advantages of the present disclosure more comprehensible, embodiments are illustrated in detail hereinafter with reference to accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF THE DISCLOSURE

Reference will now be made in detail to the present embodiments of the disclosure, examples of which are illustrated in the accompanying drawings. Wherever possible, the same reference numbers are used in the drawings and the description to refer to the same or like parts.

A method and a driving apparatus for identifying a sensing value according to the present disclosure may be applicable to any type of touch panel. A capacitance type touch panel is taken as an example below. The following embodiments may be deduced by analogy to other types of touch panels.

Figure 1A:
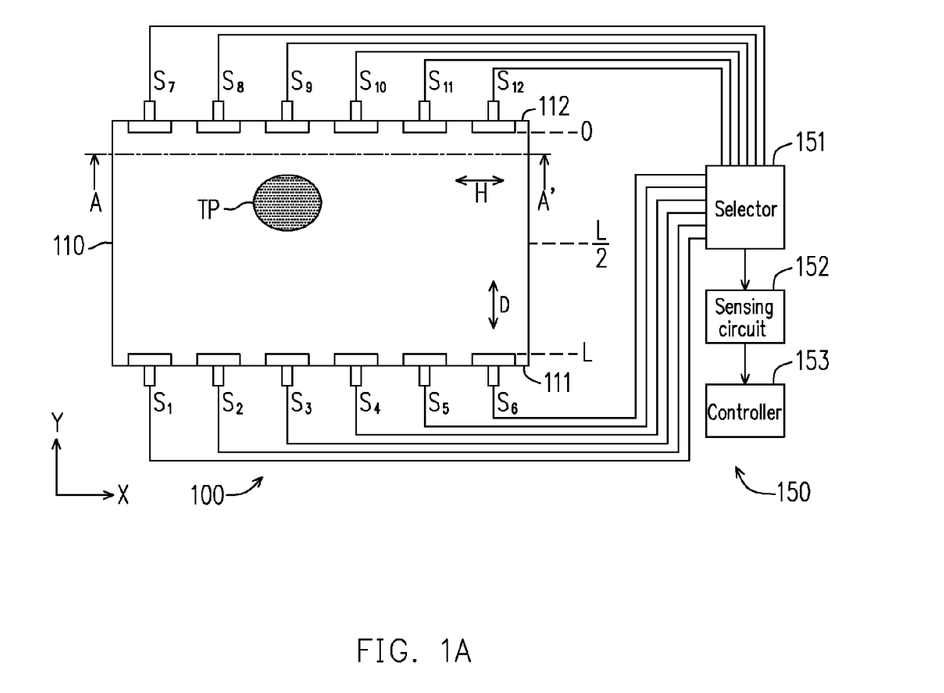
FIG. 1A is a schematic diagram of a capacitance type touch panel and a driving apparatus according to an embodiment of the present disclosure.
Figure 1B:
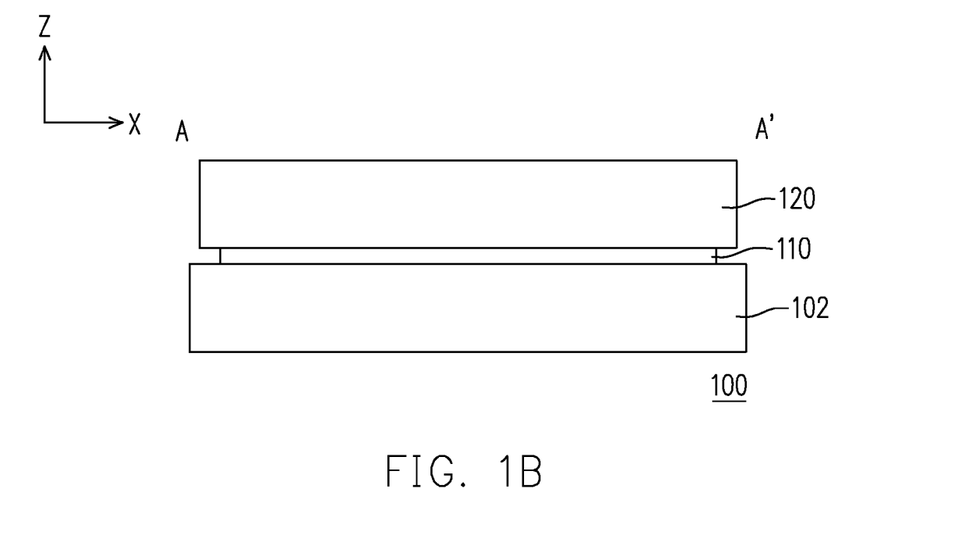
FIG. 1B is a schematic diagram of a partial section drawn along a section line A-A' of the touch panel in FIG. 1A.

FIG. 1A is a schematic diagram of a capacitance type touch panel 100 and a driving apparatus 150 according to an embodiment of the present disclosure. FIG. 1B is a schematic diagram of a partial section drawn along a section line A-A' of the touch panel 100 in FIG. 1A. In FIG. 1A and FIG. 1B, a Cartesian coordinate system, which includes an X axis direction, a Y axis direction and a Z axis direction perpendicular to one another, is introduced. The touch panel 100 includes a conductive layer 110, a cover lens 120 and a substrate 102. The conductive layer 110 is disposed on the substrate 102, and the cover lens 120 is disposed on the conductive layer 110. The conductive layer 110 has anisotropic conductivity, that is, the conductive layer 110 has different impedances in two different directions. For example, the conductive layer 110 has a low impedance direction D and a high impedance direction H shown in FIG. 1A, in which the low impedance direction D may be perpendicular to the high impedance direction H. In this embodiment, the low impedance direction D of the conductive layer 110 is the Y axis direction.

In this embodiment, the substrate 102 and/or the cover lens 120 may adopt a transparent material, such as Polyethylene (PE), Polycarbonate (PC), polyethylene terephthalate (PET), PolyMethyl MethAcrylate (PMMA), or a thinned glass substrate. The conductive layer 110 may be a conductive thin film formed of carbon nano-tubes (CNTs) aligned in parallel. The CNT thin film is manufactured by a Super Vertical-Aligned Carbon Nanotube Array in a stretching manner, and may be applied to manufacturing a transparent conductive thin film.

For example, a CNT layer is formed on a silicon substrate, a quartz substrate or other proper substrates by adopting a chemical vapor deposition (CVD) method or other proper methods. Then, a CNT thin film, that is, the conductive layer 110 is pulled out from a side edge of CNT layer along a stretching direction. Subsequently, the conductive layer 110 is disposed on the substrate 102, meanwhile the cover lens 120 covers the conductive layer 110, and the capacitance type touch panel 100 is initially completed. Because in a stretching process, CNTs in a long chain shape are approximately aligned in parallel along a stretching direction, so that the CNT thin film has a low impedance in the stretching direction, and in a perpendicular stretching direction, the impedance is about 50 to 350 times of the impedance in the stretching direction. The surface resistance of the CNT thin film is between 1 KΩ and 800 KΩ due to different measurement locations and different measurement directions, so the conductive layer 110 has anisotropic conductivity.

Referring to FIG. 1A, the low impedance direction D of the conductive layer 110 is a first axial direction, and two opposite side edges of the conductive layer 110 along the first axial direction (for example, the Y axis direction) are a first side 111 and a second side 112 respectively. A plurality of electrodes $S_i$ (i is an integer, for example, electrodes $S_1$ to $S_{12}$ shown in FIG. 1A) is disposed at the first side 111 and the second side 112. For the capacitance type touch panel 100 in FIG. 1A, only twelve electrodes $S_1$ to $S_{12}$ are taken as an implementation example, but during practical application, the number of electrodes may be determined in accordance with the area of a practical touch panel and design demands Additionally, in order to simplify the illustration, in the following embodiments, only one touch point TP is taken as an example. During practical operation, this embodiment may also be applied to a situation of multi-touch point.

Referring to FIG. 1A, the driving apparatus 150 includes a selector 151, a sensing circuit 152 and a controller 153. In this embodiment, the electrodes $S_1$ to $S_{12}$ are scanned and driven along the X axis direction. For example, the foregoing scanning and driving may be in a sequence of $S_1, S_2, S_3, S_4, S_5, S_6, S_7, S_8, S_9, S_{10}, S_{11}$, and $S_{12}$, or in other sequences (for example, a random sequence). The selector 151 is connected to the electrodes $S_1$ to $S_{12}$ of the touch panel 100. The selector 151 selects an electrode one by one in accordance with the foregoing sequence, and provides a reference voltage (for example, a grounding voltage or a reference voltage of other fixed levels) to other electrodes which are not selected. The sensing circuit 152 is connected between the selector 151 and the controller 153. When one of the electrodes $S_1$ to $S_{12}$ is selected, the sensing circuit 152 drives the selected electrode through the selector 151. For example, in the foregoing driving operation, a driving voltage (for example, a power supply voltage Vdd) is firstly applied to the selected electrode so as to charge the conductive layer 110, afterward the driving voltage is removed, a physical characteristic value (that is, raw data, for example, a voltage value, a charge quantity or a capacitance value) of the selected electrode is sensed, and a sensing result of the driven electrode is transferred to the controller 153. Therefore, the controller 153 may sense a plurality of electrodes $S_1$ to $S_{12}$ of the touch panel 100 through the sensing circuit 152, and obtain raw data RD and baseline data BL of each electrode $S_i$. In accordance with the raw data RD and the baseline data BL of each electrode $S_i$, the controller 153 may calculate a sensing value of the electrode $S_i$. The controller 153 may determine an X axis location and a Y axis location of the touch point TP by utilizing sensing values of the electrodes $S_1$ to $S_{12}$.

Figure 2A:
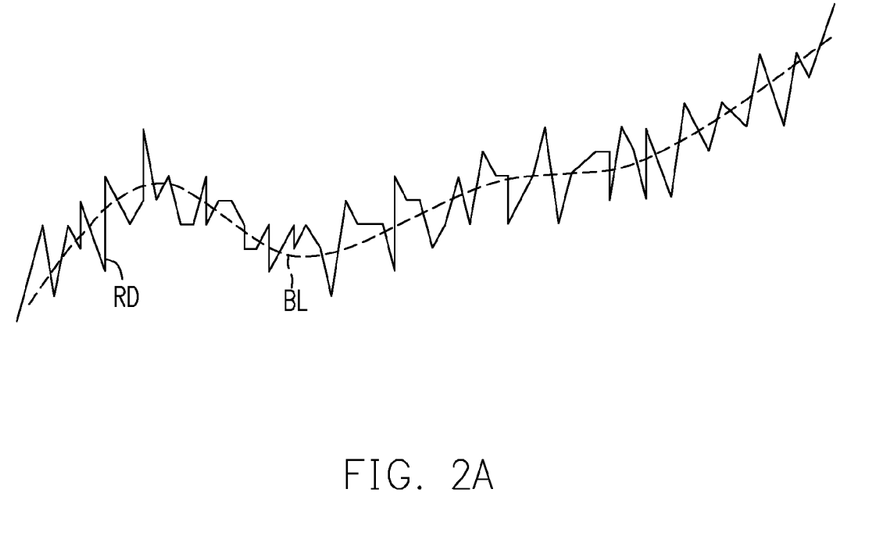
FIG. 2A illustrates a schematic diagram of capacitance raw data RD and baseline data BL of a certain sensing electrode $S_i$ of the capacitance type touch panel.

Capacitance raw data sensed by the driving circuit 150 of the capacitance type touch panel 100 may include parasitic capacitance data plus information of the touch point TP. When no touch event occurs on the touch panel 100, FIG. 2A illustrates a schematic diagram of capacitance raw data RD and baseline data BL of a certain sensing electrode $S_i$ of the capacitance type touch panel 100. The horizontal axis denotes time, and the vertical axis denotes signal intensity. Other electrodes of the touch panel 100 may refer to the illustration of the electrode $S_i$. When no touch occurs on the touch panel 100, the capacitance raw data RD converted by the driving circuit 150 is a background signal thereof. However, the average value of the background signal slowly changes due to an environment factor (for example, temperature and humidity) as time passes, so that the capacitance raw data RD basically varies with the average value as the center. Therefore, for signal processing, the controller 153 uses a filter to extract a low frequency signal of the capacitance raw data RD and convert it into baseline data BL.

Alternatively, the controller 153 calculates $BL(n)=(1-N)\times BL(n-1)+(N)\times RD$ in an exponential average manner, so as to update the baseline data BL of the electrode $S_i$. N is a constant ranging from 0 to 1, $BL(n-1)$ denotes baseline data obtained before the electrodes $S_i$ is updated, and $BL(n)$ denotes baseline data obtained after the electrodes $S_i$ is updated. Therefore, as time passes, the baseline data BL of the sensing electrode $S_i$ is always being updated.

Figure 2B:
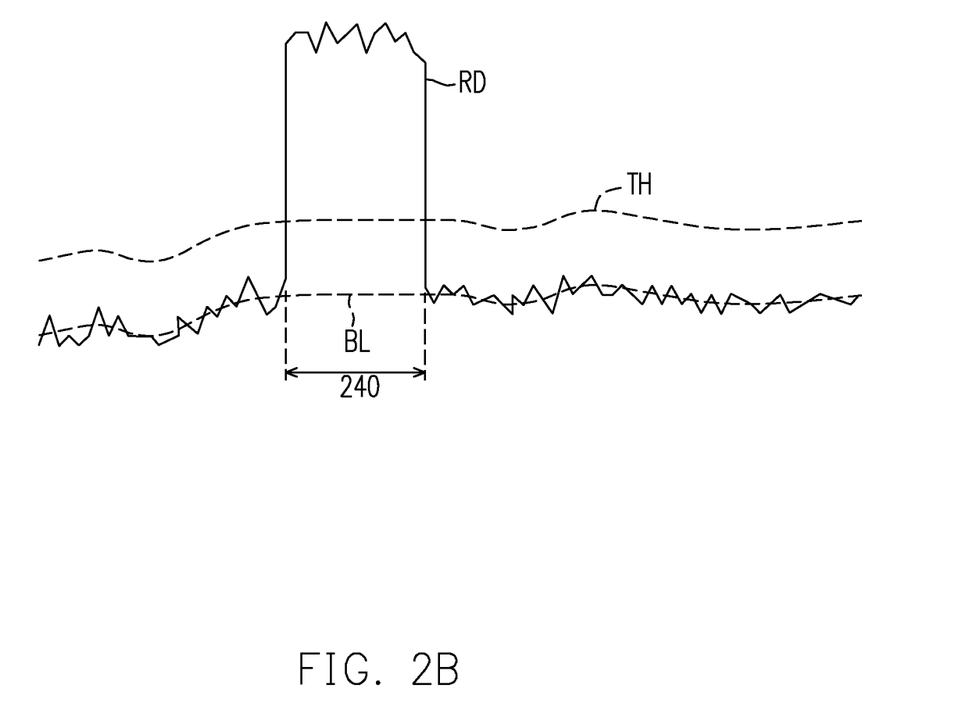
FIG. 2B illustrates a schematic diagram of capacitance raw data RD and baseline data BL of a certain sensing electrode $S_i$ of the capacitance type touch panel when the touch panel is touched.

FIG. 2B illustrates a schematic diagram of capacitance raw data RD and baseline data BL of a certain sensing electrode $S_i$ (for example, an electrode $S_9$) of the capacitance type touch panel 100 when the capacitance type touch panel 100 is touched. The horizontal axis denotes time, and the vertical axis denotes signal intensity. When the capacitance type touch panel 100 is touched, in this case, a value of the capacitance raw data RD of the electrode $S_i$ is increased due to increase of the capacitance. If the increased value of a sensing value (for example, RD−BL) of the electrode $S_i$ exceeds a threshold value TH, it is regarded that an effective touch occurs on the touch panel 100. For example, in a duration 240 shown in FIG. 2B, the capacitance raw data RD exceeds the threshold value TH, it is regarded that an effective touch occurs in the duration 240. During the duration 240, the controller 153 does not update the baseline data BL of the sensing electrode $S_i$ again, and the controller 153 may calculate a difference between the raw data RD of the sensing electrode $S_i$ and the fixed baseline data BL (that is, RD−BL) so as to take the difference (that is, RD−BL) to be served as touch signal intensity (that is, a sensing value) of the sensing electrode $S_i$.

In accordance with the raw data RD of the electrode $S_i$ and the baseline data BL of the electrode $S_i$, the controller 153 may calculate a sensing value of the electrode $S_i$. For example, the controller 153 may calculate the difference between the raw data RD of the electrode $S_i$ and the baseline data BL of the electrode $S_i$, that is, calculate RD−BL, so as to take the difference to be served as the sensing value of the electrode $S_i$. After a sensing value of each of the electrodes $S_1$ to $S_{12}$ is obtained, the controller 153 may perform a subsequent processing program for using the sensing values of the electrodes $S_1$ to $S_{12}$ to judge whether a touch event occurs on the touch panel 100, and position a touch point TP (that is, calculate the X axis location and the Y axis location of the touch point TP). An implementation example that the controller 153 positions a touch point TP is illustrated below.

Figure 3A:
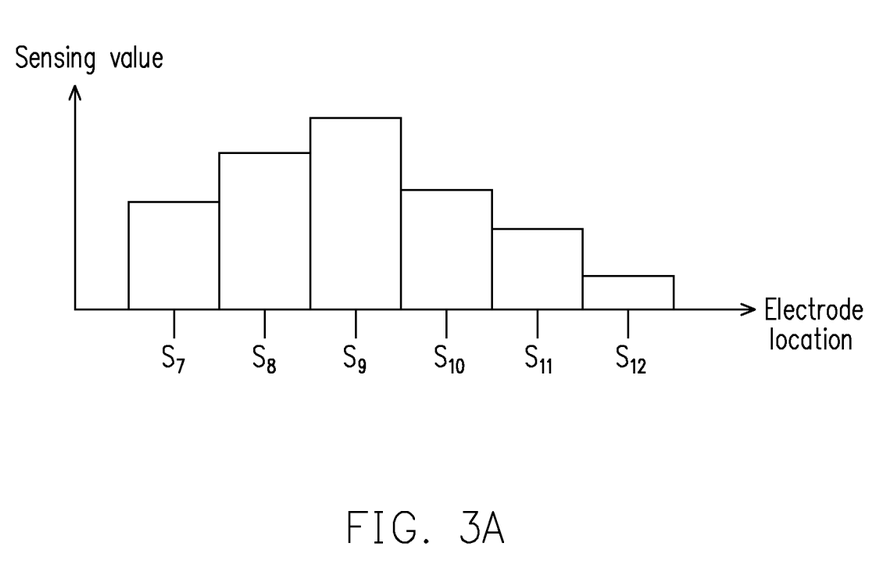
FIG. 3A is a schematic diagram of sensing values of electrodes $S_7$ to $S_{it}$ in FIG. 1A according to an embodiment of the present disclosure.
Figure 3B:
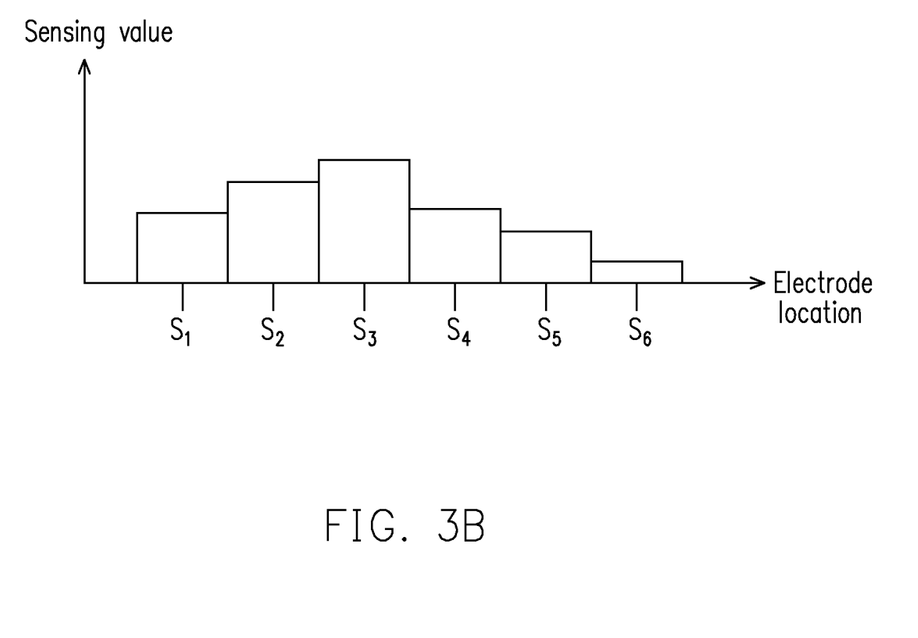
FIG. 3B is a schematic diagram of sensing values of electrodes $S_i$ to $S_6$ in FIG. 1A according to an embodiment of the present disclosure.

FIG. 3A is a schematic diagram of sensing values of electrodes $S_7$ to $S_{12}$ in FIG. 1A according to an embodiment of the present disclosure. The horizontal axis denotes locations of the electrodes $S_7$ to $S_{12}$, and the vertical axis denotes the sensing values. A touch point TP is closer to a second electrode $S_9$, so a relative extreme occurs at $S_9$ in FIG. 3A, for example, the sensing value of the electrodes $S_9$ is larger than the sensing value of each adjacent electrode. Similarly, FIG. 3B is a schematic diagram of sensing values of electrodes $S_1$ to $S_6$ in FIG. 1A according to an embodiment of the present disclosure. The horizontal axis denotes locations of the electrodes $S_1$ to $S_6$, and the vertical axis denotes the sensing values. A relative extreme also occurs at $S_3$ in FIG. 3B. Because the distance between the touch point TP and the first electrodes $S_1$ to $S_6$ is larger than the distance between the touch point TP and the second electrodes $S_7$ to $S_{12}$, the sensing value of each of the first electrodes $S_1$ to $S_6$ is wholly smaller than that of each of the second electrodes $S_7$ to $S_{12}$. The controller 153 may calculate the X axis location of the touch point TP in accordance with FIG. 3A or FIG. 3B. For example, by adopting interpolation or other algorithms, the X axis location of the touch point TP is calculated in accordance with the sensing values of the electrodes $S_8$, $S_9$, and $S_{10}$.

When it is known that a relative extreme occurs for the first electrode $S_3$ and/or the second electrode $S_9$, the controller 153 calculates the Y axis location of the touch point TP in accordance with a ratio of the sensing value of the first electrode $S_3$ to that of the second electrode $S_9$. For example, if the sensing value of the first electrode $S_3$ is A, and the sensing value of the second electrode $S_9$ is B, the ratio r=B/A. If the sensing value of the first electrode $S_3$ is smaller than the sensing value of the second electrode $S_9$, the Y axis location of the touch point TP y=L÷(2r), in which L is the distance between the first electrodes $S_1$ to $S_6$ and the second electrodes $S_7$ to $S_{12}$. If the sensing value of the first electrode $S_3$ is equal to the sensing value of the second electrode $S_9$, y=L÷2. If the sensing value of the first electrode $S_3$ is larger than the sensing value of the second electrode $S_9$, y=L−(L×r)÷2. If the sensing value of the first electrode $S_3$ is much smaller than the sensing value of the second electrode $S_9$, y=0. If the sensing value of the first electrode $S_3$ is much larger than the sensing value of the second electrode $S_9$, y=L.

Figure 4:
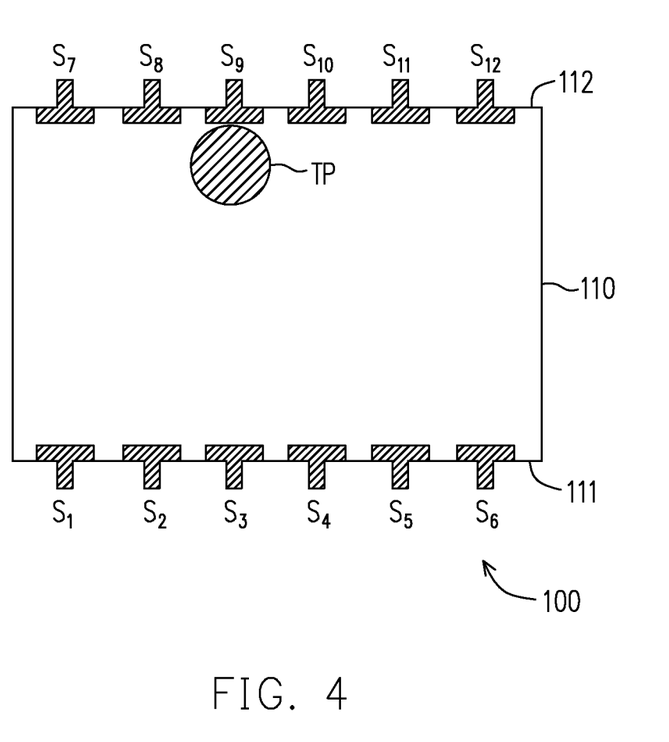
FIG. 4 illustrates a situation that a touch point is very close to a second side of the touch panel in accordance with this embodiment.
Figure 5A:
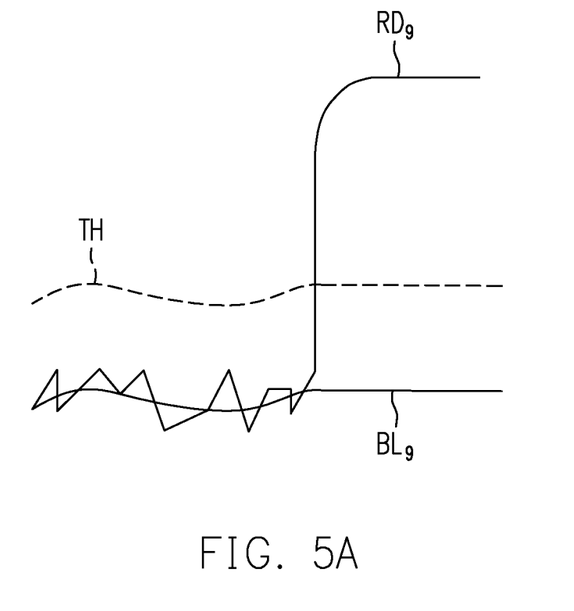
FIG. 5A is a schematic diagram of capacitance raw data $RD_9$ and baseline data $BL_9$ of the sensing electrode $S_9$ in FIG. 4.

FIG. 4 illustrates a situation that a touch point TP is very close to the second side 112 of the touch panel 100 in accordance with this embodiment. FIG. 5A is a schematic diagram of capacitance raw data $RD_9$ and baseline data $BL_9$ of the sensing electrode $S_9$ in FIG. 4. In FIG. 5A, the horizontal axis denotes time, and the vertical axis denotes signal intensity. As described above, when the controller 153 finds that the increased value of a sensing value ($RD_9-BL_9$) of the electrode $S_9$ exceeds a threshold value TH, it is regarded that an effective touch occurs on the touch panel 100. During this effective touch, the controller 153 suspends updating the baseline data $BL_9$ of the sensing electrode $S_9$, and the controller 153 may calculate $RD_9-BL_9$, so as to take the difference ($RD_9-BL_9$) to be served as touch signal intensity (that is, a sensing value) of the sensing electrode $S_9$. However, during the time when the controller 153 suspends updating the baseline data $BL_9$ of the sensing electrode $S_9$, the controller 153 may continue updating baseline data BL of other electrodes.

Figure 5B:
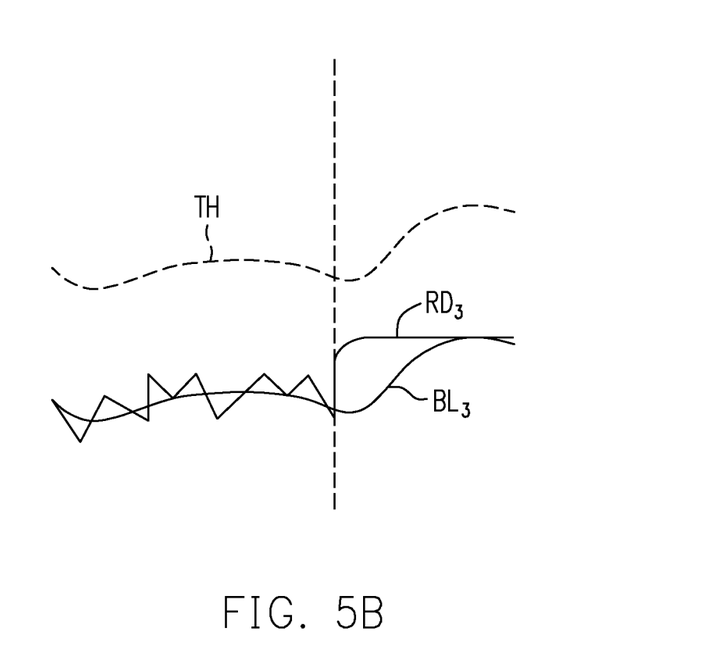
FIG. 5B is a schematic diagram of capacitance raw data $RD_3$ and baseline data $BL_3$ of the sensing electrode $S_3$ in FIG. 4.

FIG. 5B is a schematic diagram of capacitance raw data $RD_3$ and baseline data $BL_3$ of the sensing electrode $S_3$ in FIG. 4. In FIG. 5B, the horizontal axis denotes time, and the vertical axis denotes signal intensity. During the foregoing effective touch (that is, during the time when the value of $RD_9-BL_9$ in FIG. 5A exceeds the threshold value TH), because the touch point TP is very far away from the electrode $S_3$, the sensing value ($RD_3-BL_3$) of the electrode $S_3$ sensed by the sensing circuit 152 may be smaller than the threshold value TH. The sensing value of the electrode $S_3$ is smaller than the threshold value TH, so the controller 153 is always updating the baseline data $BL_3$ of the sensing electrode $S_3$ as time passes. Because the baseline data $BLp_3$ of the electrode $S_3$ is updated, the sensing value ($RD_3$–$BL_3$) of the electrode $S_3$ loses information of the touch point TP, as shown in FIG. 5B. In this case, the Y axis location of the touch point TP calculated by the controller 153 in accordance with an error sensing value of the first electrode $S_3$ and a correct sensing value of the second electrode $S_9$ is definitely incorrect. In this way, at a location close to the electrode on the touch panel 100, a non-sensing region is formed (that is, a region where the location of the touch point TP cannot be correctly sensed).

In the method for identifying the sensing value according to the foregoing embodiment, the update of the baseline data BL is decided by whether the raw data RD sensed by the electrode itself exceeds the threshold value TH. Another embodiment is exemplified below, and in addition to being judged by the value sensed by the electrode itself, the update of the baseline data BL is also judged by values sensed by other electrodes.

Figure 6:
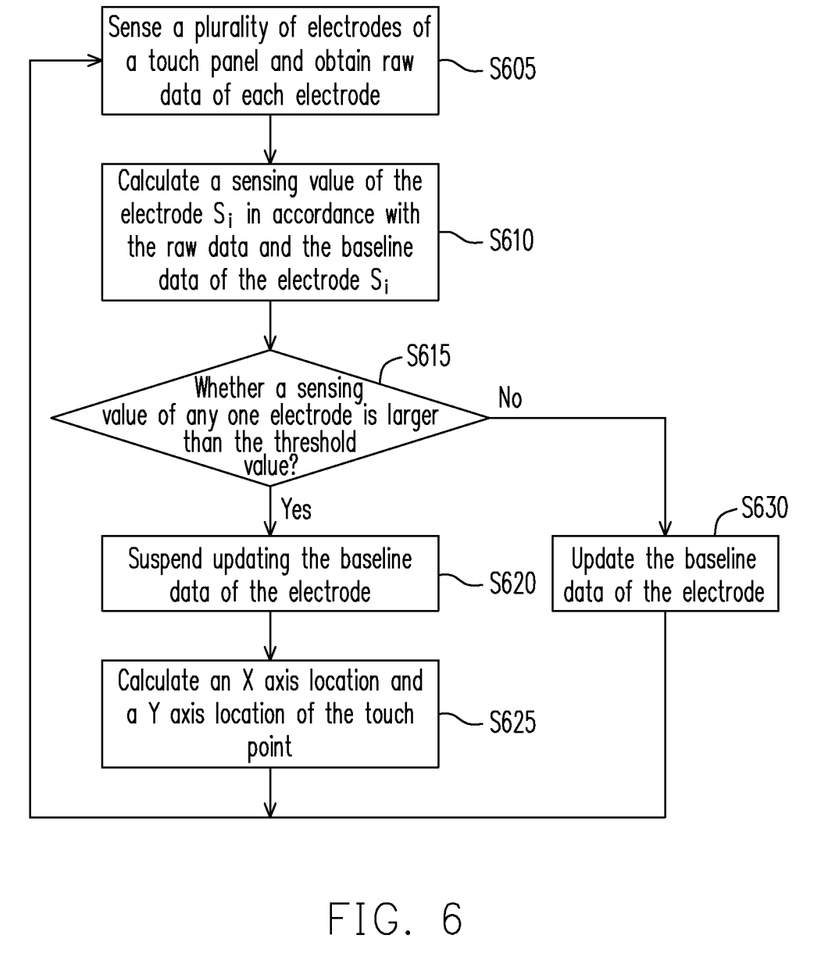
FIG. 6 is a schematic flowchart of a method for identifying a sensing value of a touch panel according to an embodiment of the present disclosure.

FIG. 6 is a schematic flowchart of a method for identifying a sensing value of a touch panel according to an embodiment of the present disclosure. In Step S605, the sensing circuit 152 senses electrodes $S_1$ to $S_{12}$ one by one through a switching operation of the selector 151, and obtains raw data RD of each electrode. In Step S610, the controller 153 calculates a sensing value of the electrode $S_i$ in accordance with the raw data RD and the baseline data BL of the electrode $S_i$. For example, the controller 153 calculates $RD_3$–$BL_3$ in accordance with the raw data $RD_3$ and the baseline data $BL_3$ of the electrode $S_3$, so as to take the difference ($RD_3$–$BL_3$) to be served as a sensing value of the electrode $S_3$. Also, for example, the controller 153 calculates $RD_9$–$BL_9$ in accordance with the raw data $RD_9$ and the baseline data $BL_9$ of the electrode $S_9$, so as to take the difference ($RD_9$–$BL_9$) to be served as a sensing value of the electrode $S_9$. Sensing values of the rest electrodes may be deduced by analogy.

In Step S615, the controller 153 judges whether a sensing value of any one electrode is larger than the threshold value TH. When the sensing values of the electrodes $S_1$ to $S_{12}$ are all smaller than the threshold value TH, the controller 153 updates the baseline data $BL_i$ of the electrode S in accordance with the raw data $RD_i$ of the electrode $S_i$ (Step S630). For example, the controller 153 calculates $BL_3(n)=(1-N) \times BL_3(n-1)+(N) \times RD_3$, in which N is a constant ranging from 0 to 1, so as to update the baseline data $BL_3$ of the electrode $S_3$. Also, for example, the controller 153 calculates $BL_9(n)=(1-N) \times BL_9(n-1)+(N) \times RD_9$, in which N is a constant ranging from 0 to 1, so as to update the baseline data $BL_9$ of the electrode $S_9$. Baseline data $BL_i$ of the rest electrodes $S_i$ may be deduced by analogy.

When the sensing value of any one of the electrodes $S_1$ to $S_{12}$ is larger than the threshold value TH, the controller 153 suspends updating the baseline data BL of all the electrodes $S_1$ to $S_{12}$ (Step S620). Afterward, the controller 153 may calculate the sensing values of the electrodes $S_1$ to $S_{12}$ in accordance with the baseline data BL and the raw data RD. Next, the controller 153 may perform Step S625, that is, calculate an X axis location and a Y axis location of the touch point TP by using the sensing values of the electrodes $S_1$ to $S_{12}$. For the implementation manner of Step S625 may refer to the illustration of the previous embodiment, or the X axis location and the Y axis location of the touch point TP are calculated with other algorithms.

Figure 7A:
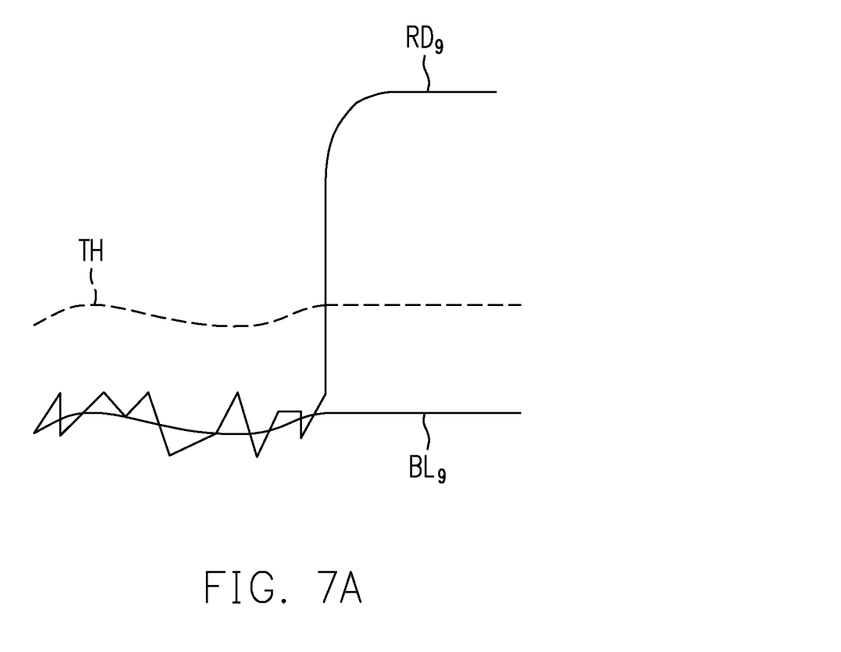
FIG. 7A is a schematic diagram of the capacitance raw data $RD_9$ and the baseline data $BL_9$ of the sensing electrode $S_9$ in FIG. 4.
Figure 7B:
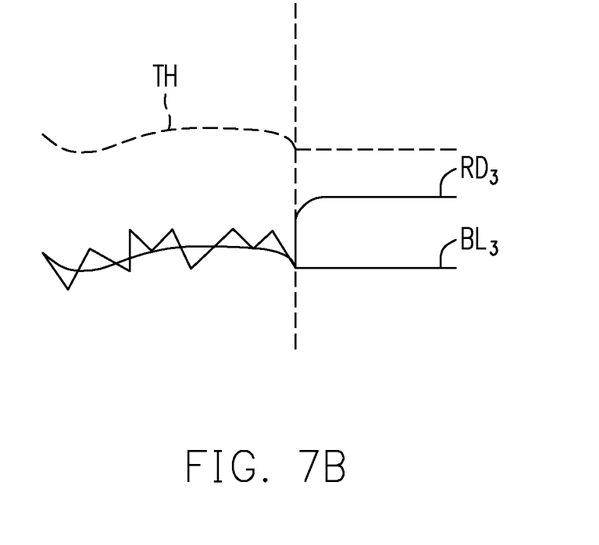
FIG. 7B is a schematic diagram of the capacitance raw data $RD_3$ and the baseline data $BL_3$ of the sensing electrode $S_3$ in FIG. 4.

FIG. 7A is a schematic diagram of the capacitance raw data $RD_9$ and the baseline data $BL_9$ of the sensing electrode $S_9$ in FIG. 4. FIG. 7B is a schematic diagram of the capacitance raw data $RD_3$ and the baseline data $BL_3$ of the sensing electrode $S_3$ in FIG. 4. In FIG. 7A and FIG. 7B, the horizontal axis denotes time, and the vertical axis denotes signal intensity. When no touch event occurs on the touch panel 100, the baseline data $BL_3$ of the electrode $S_3$ and the baseline data $BL_9$ of the electrode $S_9$ both change as a background signal changes. When a touch object is close to the electrode $S_9$, the raw data $RD_9$ of the electrode $S_9$ exceeds the threshold value TH. When the controller 153 finds that the sensing value ($RD_9$–$BL_9$) of the electrode $S_9$ exceeds the threshold value TH, it is regarded that an effective touch occurs on the touch panel 100. During the effective touch, the sensing value ($RD_3$–$BL_3$) of the electrode $S_3$ does not exceed the threshold value TH, but the controller 153 performs Step S620 to suspend updating the baseline data BL of all the electrodes $S_1$ to $S_{12}$, so the sensing value ($RD_3$–$BL_3$) of the electrode $S_3$ still may store information of the touch point TP. In this case, the controller 153 may calculate the Y axis location of the touch point TP in accordance with a correct sensing value of the first electrode $S_3$ and a correct sensing value of the second electrode $S_9$. In this way, non-sensing regions of the touch panel 100 may be reduced.

In conclusion, when the sensing value of any one of the electrodes $S_1$ to $S_{12}$ of the touch panel 100 is larger than the threshold value TH, in the foregoing embodiment, by suspending updating the baseline data BL of all the electrodes $S_1$ to $S_{12}$, the sensing value smaller than the threshold value is retained. In this way, signal distortion on some electrodes far away from a touch location due to the update of the baseline data BL can be prevented. Therefore, a subsequent processing program may more precisely position the touch point TP by utilizing the sensing value smaller than the threshold value TH.

Figure 8:
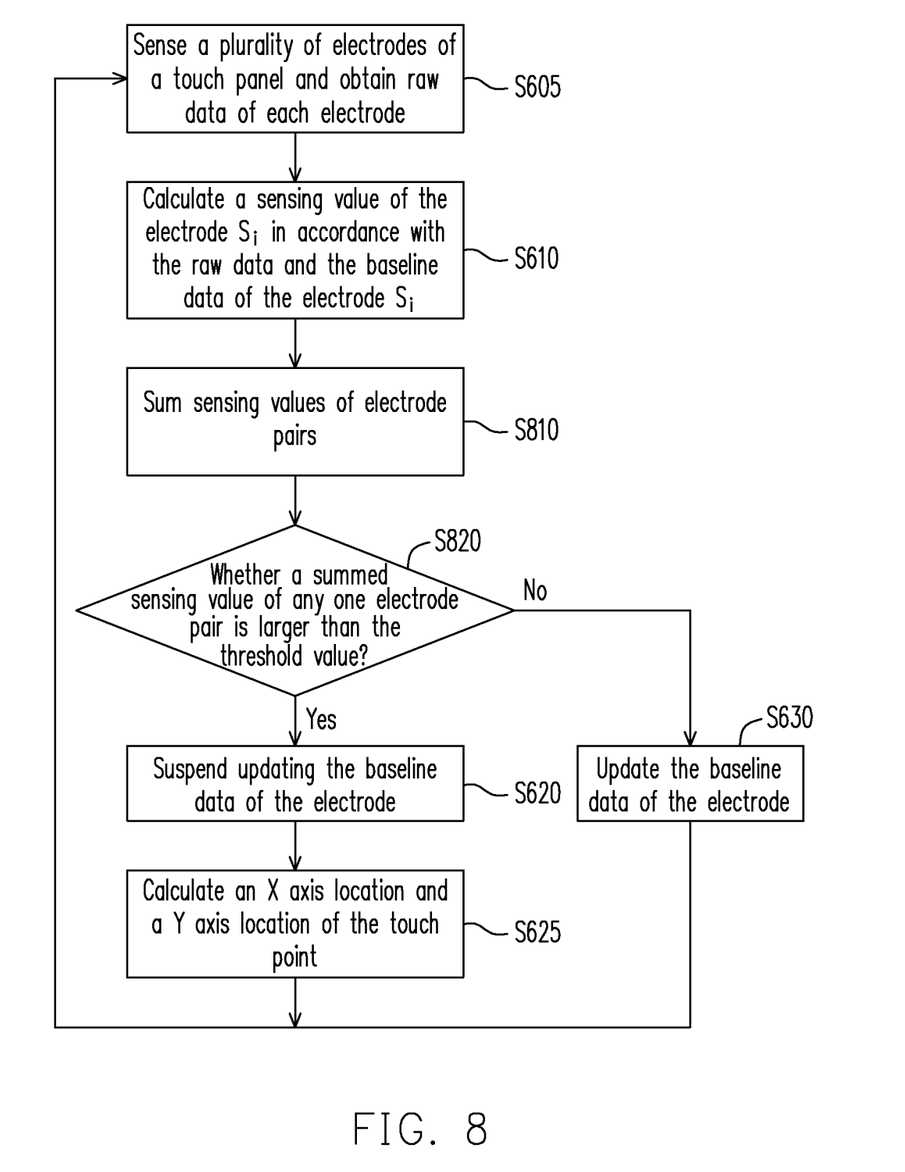
FIG. 8 is a schematic flowchart of a method for identifying a sensing value of a touch panel according to another embodiment of the present disclosure.

In the foregoing embodiment, raw data RD or a sensing value of a single electrode is used as a judgment basis. However, the implementation manner of the present disclosure is not limited thereto. For example, FIG. 8 is a schematic flowchart of a method for identifying a sensing value of a touch panel according to another embodiment of the present disclosure. Referring to FIG. 1 and FIG. 8, in this embodiment, the first electrode $S_1$ and the second electrode $S_7$ are regarded as a first electrode pair, the first electrode $S_2$ and the second electrode $S_8$ are regarded as a second electrode pair, the first electrode $S_3$ and the second electrode $S_9$ are regarded as a third electrode pair, the first electrode $S_4$ and the second electrode $S_{10}$ are regarded as a fourth electrode pair, the first electrode $S_5$ and the second electrode $S_{11}$ are regarded as a fifth electrode pair, and the first electrode $S_6$ and the second electrode $S_{12}$ are regarded as a sixth electrode pair. In each electrode pair, a direction from the first electrodes to the second electrodes is the first axial direction (or the low impedance direction D).

Steps S605, S610, S620, S625, and S630 in FIG. 8 are the same as those in FIG. 6. In Step S605, the sensing circuit 152 senses a plurality of electrode pairs of the touch panel 100 through the selector 151, and transfers a plurality of obtained raw data to the controller 153. The controller 153 performs Step S610, that is, calculates a sensing value of the electrode $S_i$ in accordance with the raw data and the baseline data of the electrode $S_1$. After Step S610, the controller 153 performs Step S810, that is, sums the sensing values of each electrode pair respectively. For example, in Step S810, the sum of the sensing value of the first electrode $S_i$ and the sensing value of the second electrode $S_7$ are used as the sensing value of the first electrode pair, and the sum of the sensing value of the first electrode $S_2$ and the sensing value of the second electrode $S_8$ are used as the sensing value of the second electrode pair. The rest is deduced by analogy.

In Step S820, the controller 153 judges whether a sensing value (that is, the sum of a sensing value of a first electrode and a sensing value of a second electrode) of any one of the electrode pairs is larger than the threshold value TH. When the sensing values of the electrode pairs are all smaller than the threshold value TH, the controller 153 updates the baseline data of the electrode $S_i$ in accordance with the raw data $RD$ of the electrode $S_i$ (Step S630). When the sensing value of any one of the electrode pairs is larger than the threshold value TH, the controller 153 suspends updating the baseline data BL of the electrode pairs (Step S620). Taking FIG. 4 as an example, when the sensing value of (that is, $S_3+S_9$) of the third electrode pair is larger than the threshold value TH, the controller 153 suspends updating the baseline data BL of all the electrode pairs. Next, the controller 153 may perform Step S625, that is, calculate an X axis location and a Y axis location of the touch point TP by using the sensing values of the electrodes $S_1$ to $S_{12}$. The advantage of doing so is as follows: raw data RD of opposite electrodes is in a mutual inverse proportion relationship, after the raw data is summed, dependence on a location may be reduced, and in this way, touch signal intensity is judged accurately.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for identifying a sensing value of a touch panel, comprising:
   sensing a plurality of electrodes of the touch panel to obtain raw data and baseline data of each electrode, wherein an electrode $S_i$ denotes an ith electrode of the electrodes of the touch panel;
   calculating a sensing value of the electrode $S_i$ in accordance with the raw data and the baseline data of the electrode $S_i$;
   when sensing values of all the electrodes $S_i$ are smaller than a threshold value, updating the baseline data of the electrode $S_i$ in accordance with the raw data of the electrode $S_i$; and
   when a sensing value of at least one of the electrode $S_i$ of the electrodes is larger than the threshold value, that is when that the sensing values of all the electrodes $S_i$ are smaller than the threshold value is false, suspending updating the baseline data of all the electrodes.

2. The method according to claim 1, wherein the step of updating the baseline data of the electrode $S_i$ comprises:
   calculating $BL_i(n)=(N-1)\times BL_i(n-1)+(N)\times RD_i$, wherein N is a constant ranging from 0 to 1, $RD_i$ denotes the raw data of the electrode $S_i$, $BL_i(n-1)$ denotes baseline data obtained before the electrode $S_i$ is updated, and $BL_i(n)$ denotes baseline data obtained after the electrode $S_i$ is updated.

3. The method according to claim 1, wherein the step of calculating the sensing value of the electrode $S_i$ comprises:
   calculating a difference between the raw data and the baseline data of the electrode $S_i$, so as to take the difference to be served as the sensing value of the electrode $S_i$.

4. The method according to claim 1, wherein the touch panel comprises a conductive layer with anisotropic conductivity, a low impedance direction of the conductive layer is a first axial direction, two opposite side edges of the conductive layer along the first axial direction are a first side and a second side respectively, and the electrodes are disposed at the first side and the second side.

5. The method according to claim 4, wherein the conductive layer is a carbon nano-tube (CNT) thin film.

6. A driving apparatus of a touch panel, comprising:
   a selector, connected to a plurality of electrodes of the touch panel, wherein an electrode $S_i$ denotes an ith electrode of the electrodes of the touch panel;
   a sensing circuit, connected to the selector, wherein the sensing circuit senses the electrodes one by one through a switching operation of the selector, and obtains raw data and baseline data of each electrode $S_i$; and
   a controller, connected to the sensing circuit, wherein the controller calculates a sensing value of the electrode $S_i$ in accordance with the raw data and the baseline data of the electrode $S_i$;
   when sensing values of all the electrodes $S_i$ are smaller than a threshold value, the controller updates the baseline data of the electrode $S_i$ in accordance with the raw data of the electrode $S_i$; and
   when a sensing value of at least one of the electrode $S_i$ of the electrodes is larger than the threshold value, that is when that the sensing values of all the electrodes $S_i$ are smaller than the threshold value is false, the controller suspends updating the baseline data of all the electrodes.

7. The driving apparatus of the touch panel according to claim 6, wherein if $RD_i$ denotes the raw data of the electrode $S_i$, $BL_i(n-1)$ denotes baseline data obtained before the electrode $S_i$ is updated, and $BL_i(n)$ denotes baseline data obtained after the electrode $S_i$ is updated, the controller calculates $BL_i(n)=(N-1)\times BL_i(n-1)+(N)\times RD_i$, so as to update the baseline data of the electrode $S_i$, wherein N is a constant ranging from 0 to 1.

8. The driving apparatus of the touch panel according to claim 6, wherein the controller calculates a difference between the raw data and the baseline data of the electrode $S_i$, so as to take the difference to be served as the sensing value of the electrode $S_i$.

9. The driving apparatus of the touch panel according to claim 6, wherein the touch panel comprises a conductive layer with anisotropic conductivity, a low impedance direction of the conductive layer is a first axial direction, two opposite side edges of the conductive layer along the first axial direction are a first side and a second side respectively, and the electrodes are disposed at the first side and the second side.

10. The driving apparatus of the touch panel according to claim 9, wherein the conductive layer is a carbon nano-tube (CNT) thin film.

11. A method for identifying a sensing value of a touch panel, wherein two opposite side edges of the touch panel along a first axial direction are a first side and a second side respectively, the touch panel comprises a plurality of electrode pairs, the electrode pairs respectively comprise a first electrode and a second electrode, the first electrodes are disposed at the first side of the touch panel, and the second electrodes are disposed at the second side of the touch panel, the method comprising:
   sensing the electrode pairs of the touch panel to obtain raw data and baseline data of each electrode, wherein an electrode $S_i$ denotes one of the first electrodes and the second electrodes of the touch panel;
   calculating a sensing value of the electrode $S_i$ in accordance with the raw data and the baseline data of the electrode $S_i$;

when sums of sensing values of first electrodes and sensing values of second electrodes of the all electrode pairs are smaller than a threshold value, updating the baseline data of the electrode $S_i$ in accordance with the raw data of the electrode $S_i$; and when the sum of the sensing value of the first electrode and the sensing value of the second electrode of at least one of the electrode pairs is larger than the threshold value, that is when that the sums of the sensing values of the first electrodes and the sensing values of the second electrodes of the all electrode pairs are smaller than the threshold value is false, suspending updating the baseline data of all the electrode pairs.

12. The method according to claim 11, wherein the step of updating the baseline data of the electrode $S_i$ comprises:

calculating $BL_i(n)=(N-1) \times BL_i(n-1) \times RD_i$, wherein N is a constant ranging from 0 to 1, $RD_i$ denotes the raw data of the electrode $S_i$, $BL_i(n-1)$ denotes baseline data obtained before the electrode $S_i$ is updated, and $BL_i(n)$ denotes baseline data obtained after the electrode $S_i$ is updated.

13. The method according to claim 11, wherein the step of calculating the sensing value of the electrode $S_i$ comprises:

calculating a difference between the raw data and the baseline data of the electrode $S_i$, so as to take the difference to be served as the sensing value of the electrode $S_i$.

14. The method according to claim 11, wherein the touch panel comprises a conductive layer with anisotropic conductivity, and a low impedance direction of the conductive layer is the first axial direction.

15. The method according to claim 14, wherein the conductive layer is a carbon nano-tube (CNT) thin film.

16. The method according to claim 11, wherein in the electrode pairs, a direction from the first electrodes to the second electrodes is the first axial direction.

* * * * *